United States Patent [19]
Lang et al.

[11] Patent Number: 5,797,624
[45] Date of Patent: Aug. 25, 1998

[54] INTEGRAL LABEL/GASKET FOR CRIMPED INFLATOR HOUSING

[75] Inventors: Gregory J. Lang, South Ogden; Brian H. Fulmer, Farr West, both of Utah; Todd S. Parker, Hollister, Calif.; Harry W. Miller, II, Ogden; Scott A. Jackson, Centerville, both of Utah; Steven A. Spear, Denver, Colo.; Graig S. Oba, San Jose, Calif.

[73] Assignee: Morton International, Inc., Chicago, Ill.

[21] Appl. No.: 704,280

[22] Filed: Aug. 28, 1996

[51] Int. Cl.$^6$ ............................................. B60R 21/26
[52] U.S. Cl. ............................................. 280/741
[58] Field of Search ........................ 280/728.2, 731, 280/741, 737, 736

[56] References Cited

U.S. PATENT DOCUMENTS

| | | | |
|---|---|---|---|
| 4,858,951 | 8/1989 | Lenzen | 280/741 |
| 5,060,973 | 10/1991 | Giovanetti | 280/741 |
| 5,482,316 | 1/1996 | Lang et al. | 280/741 |
| 5,556,130 | 9/1996 | Fulmer | 280/741 |
| 5,613,706 | 3/1997 | Parker et al. | 280/741 |

*Primary Examiner*—Paul N. Dickson
*Attorney, Agent, or Firm*—George W. Rauchfuss, Jr.; Gerald K. White

[57] ABSTRACT

An integral label/gasket for use in crimped sealing engagement with an airbag inflator. The integral label/gasket combines a flat, generally annular label, an annular, deformable outer gasket seal and an annular, deformable inner gasket seal into one component. The outer gasket seal is secured to and extends downwardly from a bottom surface of the label adjacent an outer edge of the label, and the inner gasket seal is secured to and extends downwardly from the bottom surface of the label adjacent an inner edge of the label. The label, for printing handling and operational warnings and other information thereon, has adhesive on a top surface thereof for securing the label to a baseplate of an airbag inflator. The outer gasket seal and the outer edge of the label are sized to be secured between the baseplate and a lower marginal edge of a cylindrical outer sidewall of the airbag inflator crimped radially inwardly engaging the baseplate, with the outer gasket seal providing a seal between the baseplate and the outer sidewall. The inner gasket seal and the inner edge of the label are sized to be secured between the baseplate and a lower marginal edge of a cylindrical inner sidewall of the airbag inflator crimped radially inwardly engaging the baseplate, with the inner gasket seal providing a seal between the baseplate and the inner sidewall.

16 Claims, 1 Drawing Sheet

INTEGRAL LABEL/GASKET FOR CRIMPED INFLATOR HOUSING

FIELD OF THE INVENTION

The present invention relates to a crimped airbag inflator housing and, more particularly, to a integral label/gasket for use in crimped sealing engagement with a crimped airbag inflator housing.

BACKGROUND OF THE INVENTION

An airbag module is employed in an automobile for protecting an occupant against injury by deploying an inflated airbag cushion to physically restrain the occupant's body when the automobile encounters a collision. An airbag inflator produces inflation gas for inflating the airbag cushion.

U.S. Pat. No. 5,482,316 discloses airbag inflators having inflator housings with crimped-formed joints. The inflator housing contains means for generating a volume of inflation gas for inflating an airbag cushion, and has an inverted, cup-shaped diffuser cover with a cylindrical outer sidewall depending from a top wall to a lower portion defining an open bottom of the diffuser cover. An annular baseplate closes the open bottom of the diffuser cover, spaced apart from the top wall of the diffuser cover. A cylindrical inner sidewall is located within and coaxially aligned with the cylindrical outer sidewall and depends from the top plate of the diffuser cover to a lower portion extending through the annular baseplate.

The lower portion of the inner sidewall is deformed radially outwardly to engage the underside of the baseplate and secure the baseplate to the diffuser cover. An annular, deformable inner gasket seal is secured and deformed between the radially outwardly deformed lower portion of the inner sidewall and the underside of the baseplate, providing a hermetic seal between the inner sidewall and the baseplate.

On some of the inflator housings disclosed, the lower portion of the outer sidewall is deformed or crimped radially inwardly to engage the underside of the baseplate and secure the baseplate to the diffuser cover. An annular, deformable outer gasket seal is secured and deformed between the deformed lower portion of the outer sidewall and the underside of the baseplate, providing a hermetic seal between the outer sidewall and the baseplate. However, it has been found that the outer gasket has a tendency to pop out from between the lower portion of the outer sidewall and the underside of the baseplate during crimping of the lower portion of the outer sidewall.

An annular label for printing warnings and other information pertaining to the safe use and operation of the airbag inflator is normally secured to the underside of the baseplate after assembly of the airbag inflator. The inner gasket, the outer gasket and the label, therefore, comprise three separate parts of the airbag inflator, requiring three separate assembly steps.

SUMMARY OF THE INVENTION

An object, therefore, of the present invention is to provide an integral label/gasket combining a label and an inner gasket seal in a single component for use with a crimped inflator housing.

Another object of the present invention is to provide an integral label/gasket combining a label and an outer gasket seal in a single component.

An additional object of the present invention is to combine a label, an outer gasket seal and an inner gasket seal into a single component.

A further object of the present invention is to provide a integral label/gasket that will position an outer gasket seal between a lower portion of an outer sidewall of an inflator housing and the underside of the baseplate during crimping of the lower portion of the outer sidewall.

In carrying out this invention, there is provided a integral label/gasket for use in crimped sealing engagement with a housing of an airbag inflator. The integral label/gasket includes a flat, generally annular label that has a top surface, a bottom surface for printing thereon, an inner edge and an outer edge. The integral label/gasket also includes at least one of an annular, deformable outer gasket seal secured to and extending downwardly from the bottom surface of the label adjacent the outer edge of the label or an annular, deformable inner gasket seal secured to and extending downwardly from the bottom surface of the label adjacent the inner edge of the label.

According to one aspect of the present invention, the integral label/gasket further includes an adhesive covering at least a portion of the top surface of the label. According to another aspect of the present invention, the integral label/gasket includes both the annular, deformable outer gasket seal secured to and extending downwardly from the bottom surface of the label adjacent the outer edge of the label, and the annular, deformable inner gasket seal secured to and extending downwardly from the bottom surface of the label adjacent the inner edge of the label.

According to an additional aspect of the present invention an airbag inflator is provided and has an inflator housing containing means for generating a volume of inflation gas for inflating an airbag. The inflator housing includes an inverted cup-shaped diffuser cover having a generally circular top wall and a generally cylindrical outer sidewall depending from the top wall to a lower portion defining an open bottom of the diffuser cover. A generally circular baseplate closes the open bottom of the diffuser cover and is spaced-apart from the top wall of the diffuser cover.

The inflator housing also includes an integral label/gasket having a flat, generally circular label. The label has a top surface, a bottom surface for printing thereon and an outer edge, and is positioned under and substantially covers an underside of the baseplate. An annular, deformable outer gasket seal is secured to and extends downwardly from the bottom surface of the label adjacent the outer edge of the label. The lower portion of the outer sidewall is deformed radially inwardly to engage the underside of the baseplate and secure the baseplate to the diffuser cover. The label and outer gasket seal are secured between the deformed lower portion of the outer sidewall and the underside of the baseplate with the outer gasket seal deformed by the deformed lower portion of the outer sidewall so that the outer gasket seal provides a liquid-tight seal between the outer sidewall and the baseplate.

According to a further aspect of the present invention, the top surface of the label is secured to the underside of the baseplate with an adhesive. According to still another aspect of the present invention, the baseplate of the inflator housing is annular and the label is annular and has an inner edge. The inflator housing further includes a cylindrical inner sidewall located within and coaxially aligned with the cylindrical outer sidewall and depending from the top plate of the diffuser cover to a lower portion extending through the annular baseplate and the annular label. The lower portion of the inner sidewall is deformed radially outwardly to engage the underside of the baseplate with the label secured therebetween. According to yet another aspect of the present invention, the integral label/gasket of the airbag inflator also includes an annular, deformable inner gasket seal secured to and extending downwardly from the bottom surface of the label adjacent the inner edge of the label. The inner gasket seal is secured and deformed between the radially outwardly deformed lower portion of the inner sidewall and the underside of the baseplate along with the label to provide a seal between the deformed lower portion of the inner sidewall and the baseplate.

According to still an additional aspect of the present invention, another, similar airbag inflator is provided and includes the inflator housing having a integral label/gasket. The integral label/gasket includes a flat, generally annular label having a top surface, a bottom surface for printing thereon, an inner edge and an outer edge. The label is positioned under and substantially covers the underside of the baseplate. An annular, deformable inner gasket seal is secured to and extends downwardly from the bottom surface of the label adjacent the inner edge of the label. The label and inner gasket seal are secured between the deformed lower portion of the inner sidewall and the underside of the baseplate with the inner gasket seal deformed by the deformed lower portion of the inner sidewall so that the inner gasket seal provides a seal between the inner sidewall and the baseplate.

The present invention therefore, provides an integral label/gasket that hermetically seals an inflator housing and warns those handling the inflator of potential dangers. By combining the inner gasket seal and the outer gasket seal with the label, three individual inflator parts are combined into a single component for assembly to the inflator. In addition, the label ensures that the gasket seals will remain correctly positioned on the airbag inflator during crimping of the inflator housing.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
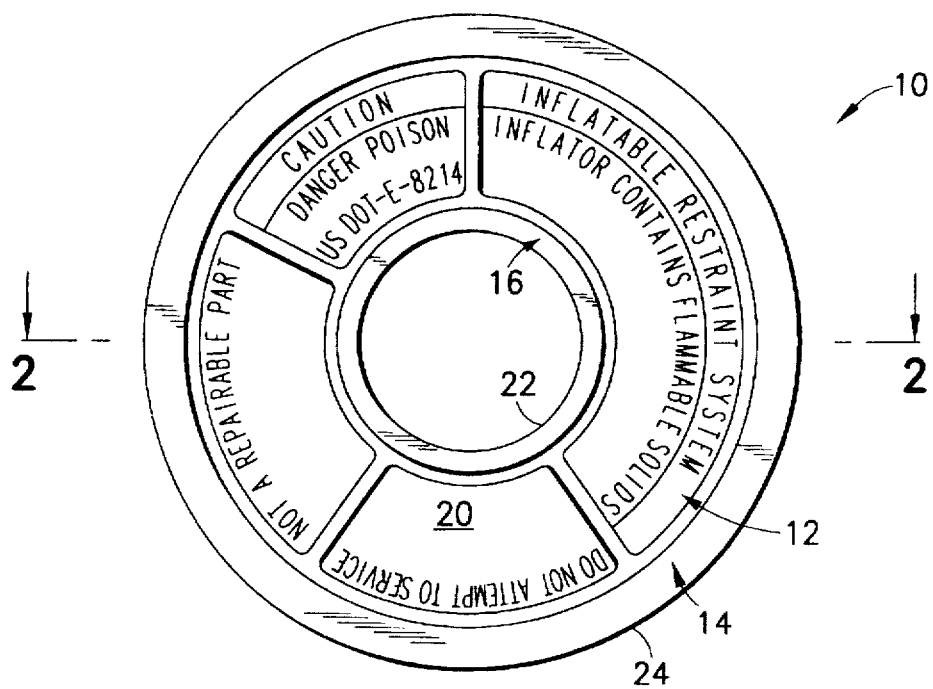
FIG. 1 is bottom elevational view of a integral label/gasket according to the present invention.
Figure 2:
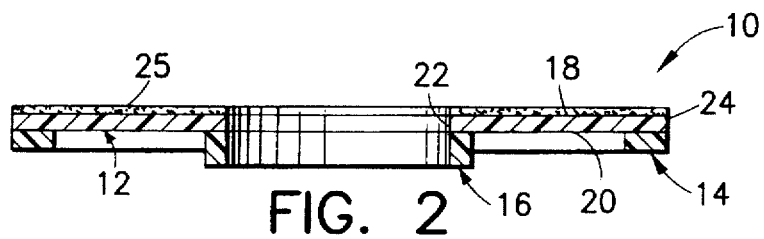
FIG. 2 is a sectional view of the integral label/gasket taken along the line 2—2 of FIG. 1.

Referring to FIGS. 1-2, the present invention is directed to an integral label/gasket 10 for use in crimped sealing engagement with an inflator housing of an airbag inflator. The integral label/gasket 10 combines a flat, generally annular label 12, an annular, deformable outer gasket seal 14, and an annular, deformable inner gasket seal 16 into a single component. The label 12 has a top surface 18, a bottom surface 20, an inner edge 22 and an outer edge 24, is made of heat resistant polyester film or another suitable material and has a thickness of about 0.005 inches. A pressure sensitive adhesive 25 covers the top surface 18 of the label 12, and the bottom surface 20 of the label is provided with printing warnings and other information pertaining to the safe handling and operation of an airbag inflator.

The outer gasket seal 14 is secured to and extends downwardly from the bottom surface 20 of the label 12 adjacent the outer edge 24 of the label. It extends around the entire outer periphery of the label 12. The outer gasket seal 14 has a thickness of about 0.04 inches, is made of silicone rubber or another suitably resilient, deformable and environmentally impervious material. Silicon rubber having Durometer 40–50, shore A, is suitable. The gasket overlays and is secured to the label 12 with a suitable pressure sensitive adhesive. The inner gasket seal 16 is secured to and extends downwardly from the bottom surface 20 of the label 12 adjacent the inner edge 22 of the label. The inner gasket seal 16 has a width of about 0.08 inches, thickness of about 0.06 inches, is also made of the same silicone rubber or another suitably resilient, deformable and environmentally impervious material and is secured to the label 12 with a suitable pressure sensitive adhesive. Alternatively, an integral label/gasket combining just the label 12 and the outer gasket seal 14, or an integral label/gasket combining just the label and the inner gasket seal 16 can be provided.

Figure 3:
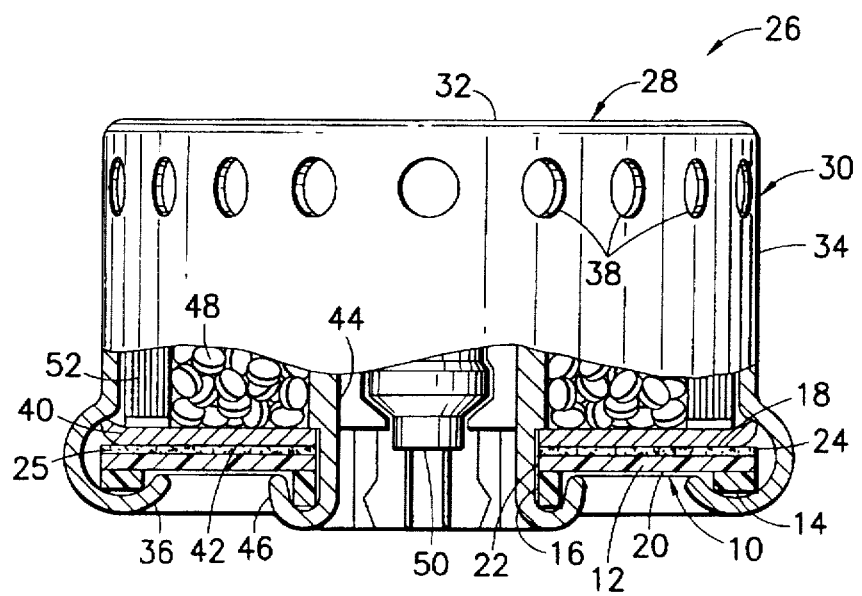
FIG. 3 is a side sectional view of a crimped inflator housing incorporating the integral label/gasket of FIG. 1.

Referring to FIG. 3, an airbag inflator 26 incorporating the integral label/gasket 10 of FIGS. 1 and 2, is provided. The label gasket 10 is shown enlarged in thickness in the drawing, for clarity. The airbag inflator 26 includes an inflator housing 28 having crimped joints. Such an airbag inflator 26 is shown and described in U.S. Pat. No. 5,482, 316, assigned to the assignee of the present invention and incorporated herein by reference.

The inflator housing 28 includes an inverted cup-shaped diffuser cover 30 having a generally circular top wall 32 and a generally cylindrical outer sidewall 34 depending from the top wall to a lower marginal edge 36 defining an open bottom of the diffuser cover. As shown, the outer sidewall 34 defines a plurality of inflation gas exhaust ports 38. A generally annular baseplate 40 closes the open bottom of the diffuser cover 30 and is spaced apart from the top wall 32 of the diffuser cover.

The top surface 18 of the label 12 of the integral label/gasket 10 is positioned under and substantially covers an underside 42 of the baseplate 40. The label 12 is secured to the baseplate 40 with the pressure sensitive adhesive 25 covering the top surface 18 of the label. The lower marginal edge 36 of the outer sidewall 34 is deformed or crimped radially inwardly to engage the underside 42 of the baseplate 40 and secure the baseplate to the diffuser cover 30. The label 12 and the outer gasket seal 14 are secured between the crimped lower portion 36 of the outer sidewall 34 and the underside 42 of the baseplate 40 with the outer gasket seal deformed by the crimped lower portion of the outer sidewall so that the outer gasket seal provides a seal between the outer sidewall and the baseplate. The label 12 positions and holds the outer gasket seal 14 so that the outer gasket seal does not pop out from between the outer sidewall 34 and the baseplate 40 during crimping of the lower portion 36 of the outer sidewall.

The inflator housing 28 further includes a cylindrical inner sidewall 44 located within and coaxially aligned with the cylindrical outer sidewall 34. The inner sidewall 44 depends from the top wall 32 of the diffuser cover 30 to a lower marginal edge 46 extending through the annular baseplate 40, the annular label 12 and the annular inner gasket seal 16. The lower marginal edge 46 of the inner sidewall 44 is deformed or crimped radially outwardly to engage the underside 42 of the baseplate 40 with the label 12 and the inner gasket seal 16 secured therebetween. The inner gasket seal 16 is deformed between the radially outwardly crimped lower marginal edge 46 of the inner sidewall 44 and the underside 42 of the baseplate 40 to provide a seal between the inner sidewall and the baseplate.

Means for generating a volume of inflation gas for passing through the plurality of inflation gas exhaust ports 38 and inflating an airbag cushion (not shown) are contained within the inflator housing 28 and include solid gas generant pellets 48 and an initiator 50. A filter assembly 52 is also contained within the inflator housing 28 for filtering the inflation gas. The inner gasket seal 16 and the outer gasket seal 14 help to hermetically seal the inflator housing 28 so that gas generant pellets will not deteriorate prior to possible use of the inflator, and also insure that inflation gas will only exit the inflator housing through the inflation gas exhaust ports 38 after passing through the filter assembly 52.

The present invention therefore, provides an integral label/gasket 10 that hermetically seals an inflator housing 28 and warns those handling the inflator of potential dangers. By combining the inner gasket seal 16 and the outer gasket seal 14 with the label 12, three individual inflator parts are combined into a single component for assembly to the airbag inflator 26. In addition, the label 12 ensures that the gasket seals will remain correctly positioned on the airbag inflator 26 during crimping of the inflator housing 28.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An integral label/gasket for use in crimped sealing engagement with a housing of an airbag inflator, the integral label/gasket comprising:

a flat, generally annular label, the label having a top surface, a bottom surface for printing thereon, an inner edge and an outer edge; and at least one annular, deformable gasket seal secured to and extending downwardly from the bottom surface of the label adjacent one of the edges of the label.

2. The integral label/gasket of claim 1 further comprising an adhesive covering at least a portion of the top surface of the label.

3. The integral label/gasket of claim 1 wherein the label is comprised of polyester.

4. The integral label/gasket of claim 1 including both an annular, deformable outer gasket seal secured to and extending downwardly from the bottom surface of the label adjacent the outer edge of the label, and an annular, deformable inner gasket seal secured to and extending downwardly from the bottom surface of the label adjacent the inner edge of the label.

5. The integral label/gasket of claim 4 wherein both the annular, deformable inner gasket seal and the annular, deformable outer gasket seal are comprised of silicone rubber and are secured to the label with adhesive.

6. An airbag inflator comprising:

A) an inflator housing including
      1) an inverted cup-shaped diffuser cover having a generally circular top wall and a generally cylindrical outer sidewall depending from the top wall to a lower marginal edge defining an open bottom of the diffuser cover, and
      2) a generally circular baseplate closing the open bottom of the diffuser cover and spaced apart from the top wall of the diffuser cover;

B) an integral label/gasket having a flat, generally circular label with a top surface, a bottom surface for printing thereon and an outer edge, the label positioned under and substantially covering an underside of the baseplate, the label/gasket including an annular, deformable outer gasket seal secured to and extending downwardly from the bottom surface of the label adjacent the outer edge of the label; and C) the lower marginal edge of the outer sidewall being deformed radially inwardly to engage the underside of the baseplate and secure the baseplate to the diffuser cover, the label and outer gasket seal secured between the deformed lower marginal edge of the outer sidewall and the underside of the baseplate with the outer gasket seal deformed by the deformed lower marginal edge of the outer sidewall so that the outer gasket seal provides a seal between the outer sidewall and the baseplate.

7. The airbag inflator of claim 6 wherein the integral label/gasket further includes an adhesive securing the top surface of the label to the underside of the baseplate.

8. The airbag inflator of claim 6 wherein the label is comprised of polyester.

9. The airbag inflator of claim 6 wherein the annular, deformable outer gasket seal is comprised of silicone rubber and secured to the label with adhesive.

10. The airbag inflator of claim 6 wherein the baseplate of the inflator housing is annular, the label is annular and has an inner edge, and the inflator housing further comprises:

D) a cylindrical inner sidewall located within and coaxially aligned with the cylindrical outer sidewall and depending from the top plate of the diffuser cover to a lower marginal edge extending through the annular baseplate and the annular label and being deformed radially outwardly to engage the underside of the baseplate with the label secured therebetween.

11. The airbag inflator of claim 10 wherein the integral label/gasket further comprises an annular, deformable inner gasket seal secured to and extending downwardly from the bottom surface of the label adjacent the inner edge of the label, the inner gasket seal being secured and deformed between the radially outwardly deformed lower marginal edge of the inner sidewall and the underside of the baseplate along with the seal to provide a seal between the deformed lower marginal edge of the inner sidewall and the baseplate.

12. The airbag inflator of claim 11 wherein the annular, deformable inner gasket seal is comprised of silicone rubber and secured to the label with adhesive.

13. An airbag inflator comprising:

A) an inflator housing including
      1) an inverted cup-shaped diffuser cover having a generally circular top wall and a generally cylindrical outer sidewall depending from the top wall to a lower marginal edge defining an open bottom of the diffuser cover,
      2) a generally annular baseplate closing the open bottom of the diffuser cover and spaced apart from the top wall of the diffuser cover, and
      3) a cylindrical inner sidewall located within and coaxially aligned with the cylindrical outer sidewall and depending from the top plate of the diffuser cover to a lower marginal edge extending through the annular baseplate; and B) an integral label/gasket including
1) a flat, generally annular label for printing thereon having a top surface, a bottom surface, an inner edge and an outer edge, the label positioned under and substantially covering an underside of the baseplate,
2) an annular, deformable inner gasket seal secured to and extending downwardly from the bottom surface of the label adjacent the inner edge of the label;

wherein the cylindrical inner sidewall also passes through the annular label and is deformed radially outwardly to engage the underside of the baseplate and secure the baseplate to the diffuser cover, the label and inner gasket seal thereby being secured between the deformed lower marginal edge of the inner sidewall and the underside of the baseplate with the inner gasket seal deformed by the deformed lower marginal edge of the inner sidewall so that the inner gasket seal provides a seal between the inner sidewall and the baseplate.

14. The airbag inflator of claim 13 wherein the integral label/gasket further includes an adhesive securing the top surface of the label to the underside of the baseplate.

15. The airbag inflator of claim 13 wherein the label is comprised of polyester.

16. The airbag inflator of claim 13 wherein the annular, deformable inner gasket seal is comprised of silicone rubber and secured to the label with adhesive.

* * * * *